(12) United States Patent
Joffe et al.

(10) Patent No.: US 7,130,412 B2
(45) Date of Patent: Oct. 31, 2006

(54) TELECOMMUNICATION LINE DRIVER HAVING SYNTHESIZED OUTPUT IMPEDANCE DERIVED FROM OUTPUT CURRENT SENSING CIRCUIT

(75) Inventors: Daniel M. Joffe, Owens Crossroads, AL (US); Robert E. Gewin, Huntsville, AL (US); Christopher J. Foran, Berkshire (GB)

(73) Assignee: Adtran, Inc., Huntsville, AL (US)

( * ) Notice: Subject to any disclaimer, the term of this patent is extended or adjusted under 35 U.S.C. 154(b) by 442 days.

(21) Appl. No.: 09/997,228

(22) Filed: Nov. 29, 2001

(65) Prior Publication Data

US 2003/0099346 A1 May 29, 2003

(51) Int. Cl.
*H04M 19/00* (2006.01)
(52) U.S. Cl. .............................. 379/387.01; 379/399.01
(58) Field of Classification Search ................ 379/394, 379/398; 330/253, 255, 260, 264, 265
See application file for complete search history.

(56) References Cited

U.S. PATENT DOCUMENTS

| | | | |
|---|---|---|---|
| 5,459,787 A | 10/1995 | Tomasini et al. ........... 379/398 |
| 5,585,763 A * | 12/1996 | Navabi et al. .............. 330/255 |
| 5,856,758 A | 1/1999 | Joffe et al. ..................... 330/85 |
| 5,999,619 A | 12/1999 | Bingel ......................... 379/394 |

\* cited by examiner

*Primary Examiner*—Sinh Tran
*Assistant Examiner*—Walter F Briney, III
(74) *Attorney, Agent, or Firm*—Allen, Dyer, Doppelt, Milbrath & Gilchrist, P.A.

(57) ABSTRACT

A synthetic impedance telecommunication line driver has no electrical energy-dissipating elements in series with its output, and synthesizes its output impedance in accordance with current fed back from an output current (mirror) sensing circuit. This allows the driver to realize substantially reduced power requirements for driving a telecommunication line, such as, but not limited to a DSX-1 line. The driver includes an operational amplifier having a first polarity input coupled through an input resistor to an input port, to which a signal voltage to applied to an output port is coupled. A second polarity input of the amplifier is coupled to a reference voltage. A feedback resistor is coupled between the amplifier output and its inverting input. An output current-dependent current source, such as a current mirror coupled in circuit with the output node, generates a current as a small fraction k of the output current. This mirrored fraction of the output current is fed back to an input of the amplifier, and enables the output impedance Zout of the driver to be defined in terms of the mirror current ratio k and the value of the driver amplifier's feedback resistor.

16 Claims, 3 Drawing Sheets

TELECOMMUNICATION LINE DRIVER HAVING SYNTHESIZED OUTPUT IMPEDANCE DERIVED FROM OUTPUT CURRENT SENSING CIRCUIT

FIELD OF THE INVENTION

The present invention relates in general to communication systems and components, and is particularly directed to a synthetic impedance telecommunication line driver, that has no electrical energy-dissipating elements in series with its output, and synthesizes its output impedance in accordance with current fed back from an output current (mirror) sensing circuit, so as to realize substantially reduced power requirements for driving a communication line, such as a DSX-1 line.

BACKGROUND OF THE INVENTION

For optimum efficiency, a telecommunication line driver should contain no dissipative elements in series with its output. Prior to the introduction of synthetic drivers, this meant not matching the driver's output impedance to that of the line. Until recently, this has not been a problem in a T1 DSX environment, as the terminating end was well matched to the line impedance, and the line impedance was homogeneous as a result of strict control of the type of cable being used. However, as customers of telecommunication equipment have become less careful about controlling the impedance of DSX-1 cross-connect cables in central office installations, the line impedance mismatch problem cannot be ignored.

As shown diagrammatically in the 'classical' circuit architecture of FIG. 1, the driver-to-line impedance mismatch problem has been conventionally addressed by terminating the output 11 of a line driver amplifier 10 with a line-coupling output resistor 13, whose value Ro is set equal to the impedance Rt (e.g., 100 ohms or more) of the line 15. Unfortunately, the power utilization efficiency is very poor, as the resulting voltage divider formed by the output resistor 13 and the line impedance 15 dissipates (wastes) half of the line driver's output power in the output impedance 13.

One approach to reducing this power dissipation problem is to synthesize the driver's output impedance in accordance with the value of a much smaller resistor, and simulate the line-matching impedance by the judicious use of positive feedback. A typical set of synthetic impedance parameters may reduce the value of the output resistor to only a fraction (e.g., one-fourth) of its normal value, and (electronically) synthesize the remaining portion (e.g., three-fourths) of the output impedance. In the case of a one-fourth/three-fourths split, the output voltage swing of the driver amplifier can be reduced from twice to only five-fourths the desired output voltage. In the ideal case, the amplifier power supply rails can be reduced to five-eighths of the supply differential for a classic driver.

It is not uncommon for circuit implementations of synthetic output impedance drivers to employ some form of relatively complex cross-coupling network or other feedback arrangements. As shown in the circuit diagram of FIG. 2, a synthesized impedance driver may be modelled as containing a voltage source Vm and an output impedance formed of two parts: 1—a synthetic resistance Rsyn, and 2—a physical output resistance Rphy. The voltage swing produced by the amplifier is Va, and the voltage swing across a load resistance RL (relative to a ground reference) is VL. For the case of reducing the physical resistor to one-fourth of its normal value, then Rphy=25% of RL and Rsyn=75% of RL. Therefore, the driver voltage source Vm must be able to provide a voltage swing of 2VL. As pointed out above, the actual voltage Va at the output node of the amplifier need only swing to 5/4 VL.

In some applications, Va must swing to a voltage greater than 5/4 VL. For example, if the value of the load resistor RL is increased substantially, Va must swing to almost 2VL. While this may cause clipping, it has the benefit of reduced output current with the increased output voltage swing. As such, a synthetic impedance line driver might also be required to swing to 2VL, just as in the case of the classical line driver. In this case, however, the synthetic driver is delivering zero or minimum current, while the classic driver is delivering its maximum output current.

The U.S. Pat. to Joffe et al, No. 5,856,758, assigned to the assignee of the present application and the disclosure of which is incorporated herein, describes an improved efficiency, positive feedback-based line driver circuit architecture that reduces the required output signal amplitude excursion required for driving the line, enhances linearity, and allows the line to be driven from amplifiers which run with a lower supply voltage, and thus results in lower power dissipation. In the Joffe et al patent, the value of the output resistor is dramatically reduced so as to enable the amount of power dissipated across the driver's output resistor to be much smaller than the one-half value of a classical driver; yet, due to positive feedback, the effective electrical output impedance seen at the line driver's output node is matched to the line impedance.

SUMMARY OF THE INVENTION

In accordance with the present invention, the power utilization efficiency improvement afforded by the positive feedback scheme of the above referenced Joffe et al. patent is enhanced even further, but without the need to include any power-dissipating element in series with the driver output. Instead, the effective output impedance Zout of the line driver is synthesized by feeding back a mirrored fraction of the output current to an input node of the driver amplifier; as a result, the output impedance Zout of the driver is defined in terms of the mirror current ratio k and the value of the driver's feedback resistor. The synthetic line driver of the invention is especially suited for high data rate signaling, such as but not limited to DSX-1 applications, and low frequency applications.

The basic architecture of the synthetic line driver includes an operational amplifier having first and second polarity inputs. A signal voltage is coupled through an input resistor to the first polarity input port of the amplifier. The second polarity input of the amplifier is coupled to a reference voltage. A feedback resistor is coupled between the amplifier output and its inverting input. An output current-dependent current source, such as a current mirror coupled in circuit with the output node, generates a current that is a prescribed small fraction k of the output current. This mirrored fraction of the output current is fed back to an input of the operational amplifier, and enables the output impedance Zout of the driver to be defined in terms of the mirror current ratio k and the value of the driver amplifier's feedback resistor.

Pursuant to a first non-limiting embodiment of the synthesized impedance line driver architecture of the invention, the output of an operational amplifier is coupled by way of an output coupling circuit to the driver's output node. The output coupling circuit includes a level shifter having a first and second level-shifted outputs, that are respectively coupled to first and second complementary polarity transistor circuits. These transistor circuits include output transistors coupled to the output node and associated current mirror transistors, that are coupled to a feedback path to the operational amplifier.

The output transistors have their current flow paths coupled in circuit with power supply voltage terminals and the output node and their control electrodes coupled to the outputs of the level shifter. The current mirror transistors produce a current proportional to the output current. This proportional current supplies a feedback current as a small fraction k of the output current provided at the output node, in accordance with the ratios of the geometries of the output and current mirror transistors. To compensate for distortion that may result from non-linearities in the ratios of the geometries of the current mirror and output transistors, a pair of the synthetic impedance drivers may be coupled in a bridge configuration.

Distortion due to the fact that the output and current mirror transistors do not see the same differential voltage may prevent the mirror current transistors from tracking the output transistors. This problem is remedied in a second embodiment of the invention, in which the input resistor is removed, and the input is applied to the non-inverting input of the operational amplifier. Because of the high gain of the driver amplifier, both of its inputs are maintained at substantially the same voltage.

In the no-load case, the voltage at the current mirror node and the voltage at the output node are the same. However, as the load increases, these voltages diverge, causing an increase in distortion in the ratio k of the mirrored current to the output current. This has less distortion than the first embodiment, since the magnitude of the voltage difference at the output and current mirror nodes is smaller.

This effect is compensated for a given load impedance in a third embodiment, by inserting a first auxiliary resistor in the mirrored current feedback path, and coupling the current mirror node through a second auxiliary resistor to the reference voltage applied to the non-inverting input of the amplifier.

To ensure that the voltage at the current mirror node always tracks the output voltage at the output current node, a fourth embodiment of the invention includes a 'feedback' operational amplifier coupled to the output node and the current mirror node. The output of the feedback amplifier is coupled as the control input to a transistor having its current flow path coupled to the power supply rails through a first auxiliary current mirror circuit and a first auxiliary bias current (Ibias) source. The first auxiliary bias current source maintains the transistor conducting for both polarities of output current.

A second auxiliary current mirror circuit is coupled to the current mirror circuit and to the inverting input of the operational amplifier to which a second auxiliary bias current source is coupled. Coupling the second auxiliary bias current source to the inverting input of the operational amplifier effectively removes the Ibias current from the overall transfer function. The output current of the transistor is mirrored by the auxiliary current mirror circuits to the inverting input of the amplifier. The output current of the transistor is the same current of the current mirror transistors plus the bias current.

DETAILED DESCRIPTION

Figure 1:
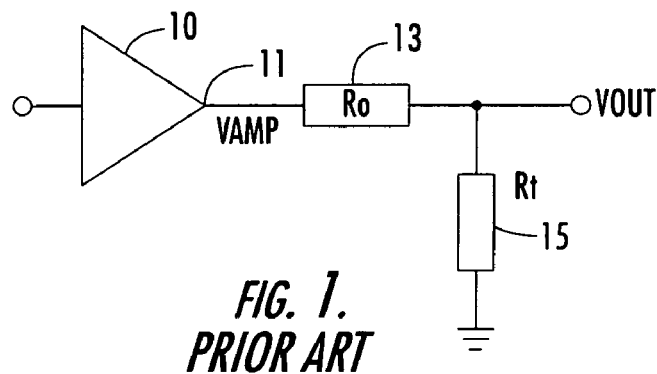
FIG. 1 diagrammatically illustrates a conventional line driver circuit.
Figure 2:
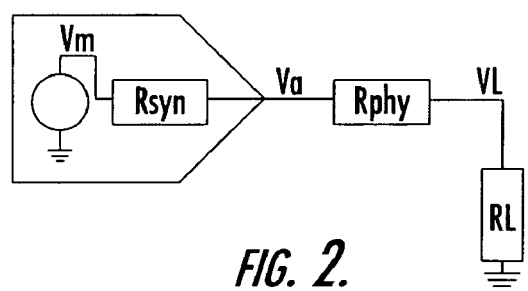
FIG. 2 is a circuit diagram model of a synthesized impedance driver.
Figure 3:
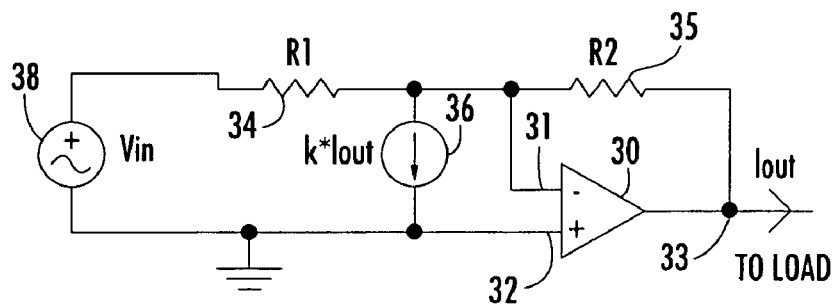
FIGS. 3 and 4 are circuit diagram models for illustrating the sensed output current-based synthesized impedance line driver of the present invention.

A circuit model of the sensed output current-based synthesized impedance line driver of the present invention is diagrammatically illustrated in FIG. 3 as comprising an operational amplifier 30 having a first (−) polarity input 31 coupled through an input resistor 34 having a value R1 to a source 38 of an input voltage Vin (shown as referenced to ground (GND)). A second (+) polarity input 32 of the amplifier 30 is referenced to GND. A feedback resistor 35 having a value R2 is coupled between an output 33 of the amplifier 30 and its (−) input 31. An output current (Iout) dependent current source 36 is coupled between the input node 31 and ground, and is operative to generate a current k*Iout that is a prescribed fraction k of the output current Iout supplied from the amplifier output 33 to a load.

It should be noted that there is no electrical energy-dissipating element, such as an output resistor, even a relatively low valued resistor, in series with the output 33 of the amplifier 30 and the load, as is customary practice for synthesizing the output impedance Zout of the driver. This is not to say that the conductive leads through which the output of the operational amplifier is coupled to the output port of the driver or the load have no resistance whatsoever. Rather, in the context of the architecture and functionality of the invention, it is to be understood that it is unnecessary to deliberately install an electrical energy-dissipating element whose resistance value is necessary to define (and is typically a scaled fraction of) the value of the synthesized output impedance Zout of the driver.

The output impedance Zout of the driver circuit model of FIG. 3 can be readily determined by applying a test current to the output node 33 and observing the resulting output voltage with Vin=0 volts. In this case, the output driver's output impedance Zout=Vout/Iout=k*R2. The open circuit gain can be determined by removing all loading from the output node 33 and measuring the output that results from the application of Vin at the input. This reduces the circuit to an inverting amplifier, since there is no contribution from the current source 36 when the output current Iout is zero. Therefore, Zout=Vout/Iout=−R2/R1 (open circuit gain).

As a non-limiting example, if the feedback resistor R2 has a value of 1000 ohms, and the current feedback ratio k=0.01, then the line driver of FIG. 3 would have an output impedance of 10 ohms, even though an ideal operational amplifier has zero output impedance, and no output resistors are present. If k is set to 0, then there is no output current feedback, and the output impedance becomes zero ohms.

Figure 4:
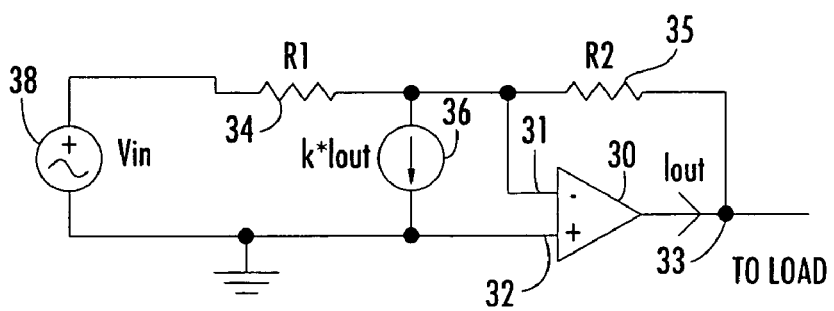

FIG. 4 shows a slight modification of the circuit model of FIG. 3, in which the output current Iout includes current through the feedback resistor 35. Including this feedback resistor is a practical expectancy in a typical integrated circuit implementation using mirrored output current feedback, as shown in FIGS. 5–8, to be described. In the modification of FIG. 4, the open circuit voltage gain Vout/Vin is decreased slightly. Namely, Vout/Vin=−(R2/R1)*(1/(1+k)). Also, the output impedance Zout becomes R2*(k/(1+k)), which is very close to the output impedance of the model of FIG. 3, but slightly decreased due to the factor 1/(1+k).

Figure 5:
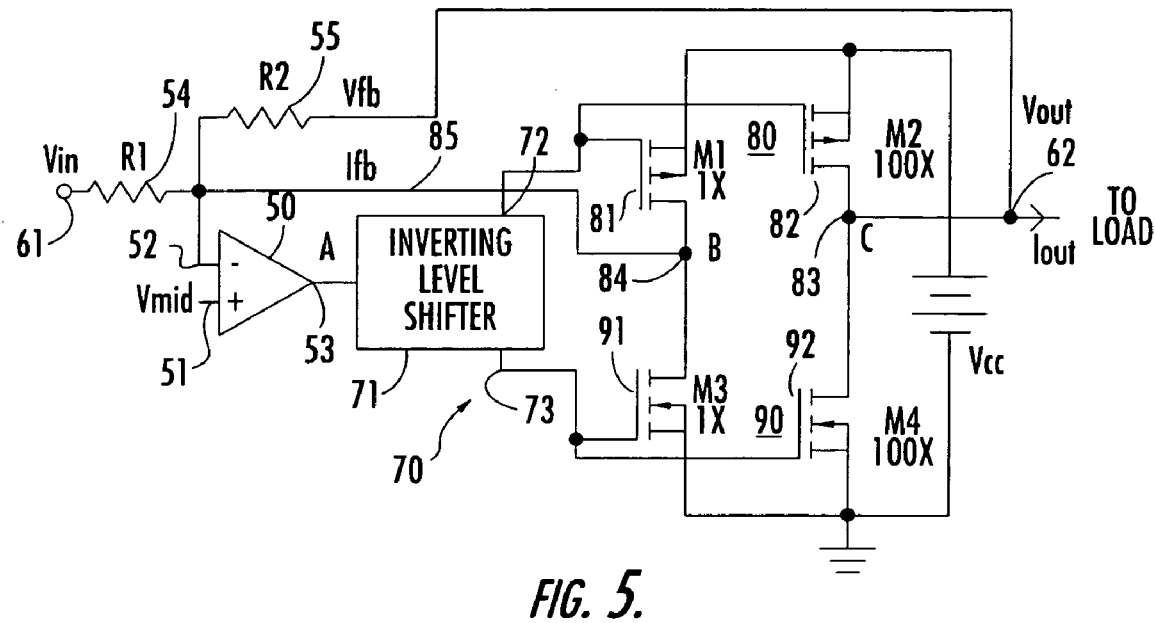
FIG. 5 diagrammatically illustrates a first embodiment of the sensed output current-based synthesized impedance line driver architecture of the invention.
Figure 6:
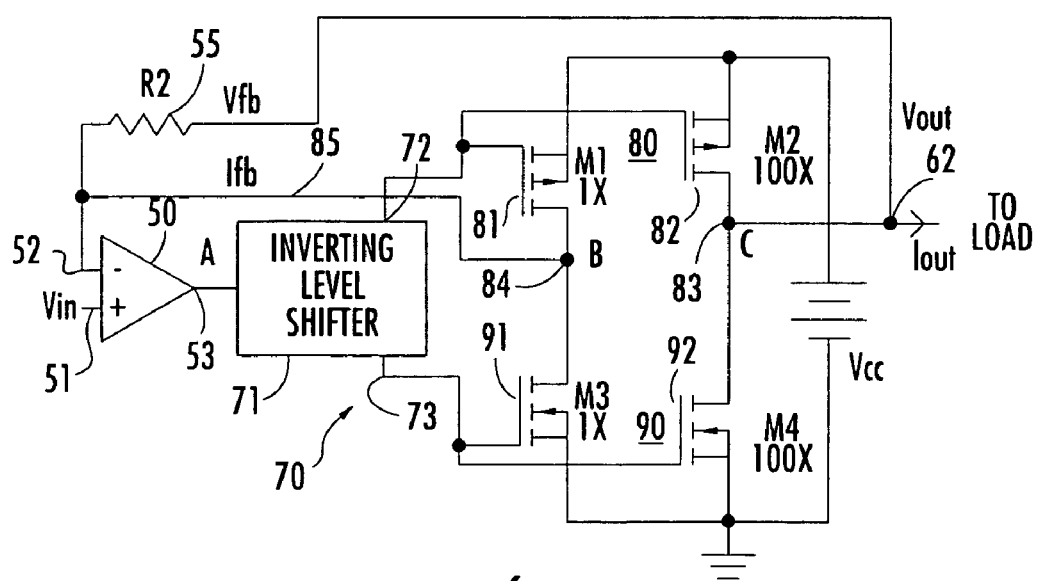
FIG. 6 diagrammatically illustrates a second embodiment of the sensed output current-based synthesized impedance line driver architecture of the invention.

A first (single ended) implementation of the sensed output current-based synthesized impedance line driver architecture of the invention modeled in the circuit diagrams of FIGS. 3 and 4 is shown diagrammatically in FIG. 5 as comprising an operational amplifier circuit 50, having first (+) and second (−) input terminals 51 and 52, respectively, and an output terminal 53. The first (+) input terminal 51 is coupled to receive a prescribed reference potential (e.g., a voltage Vmid that is midway between a pair of voltage rails Vcc and ground (GND)) used to power the circuit. The second (−) input terminal 52 is coupled through an input resistor 54 to an input port/terminal 61, which is coupled to receive an input signal Vin to be amplified and applied to an output node 62 coupled to the line to be driven. A voltage feedback resistor 55 is coupled between the output node 62 and the second input 52 of the amplifier 50, and serves the function of the feedback resistor 35 in the circuit model of FIGS. 3 and 4.

The output 53 of the operational amplifier 50 is coupled by way of a circuit path, that includes an output coupling circuit 70, to the output node 62. As described briefly above, and as will be appreciated from the discussion of the operation of the circuitry of FIG. 5, the operational amplifier's output circuit path is essentially exclusive of one or more series-coupled resistance elements, through which the synthesized output impedance of a conventional impedance driver is normally defined, and which would otherwise constitute unwanted electrical energy dissipating components, undesirably increasing the power requirements of the driver.

Pursuant to the invention, the output coupling circuit 70 includes a level shifter 71 having a first and second level-shifted outputs 72 and 73, that are respectively coupled to first and second complementary polarity transistor circuits 80 and 90. Transistor circuits 80 and 90 respectively include output transistors (which may be implemented as a complementary MOSFET pair 82 and 92, as a non-limiting example), and associated current mirror transistors (shown as MOSFETs 81 and 91).

The output MOSFETs 82 and 92 have their source-drain paths coupled in circuit with power supply voltage terminals Vcc and GND, and their drain electrodes coupled in common to a node 83, which is coupled to the output node 62. The first level-shifted output 72 of the level shifter 71 is supplied as the gate drive for MOSFETS 81 and 82. The gate drive for current mirror MOSFETS 91 and 92 is derived from the second level-shifted output 73 of the level shifter 71.

The current mirror MOSFETs 81 and 91 serve as the output current (Iout) dependent current source 36 of FIGS. 3 and 4, described above, and have their source-drain paths coupled in circuit with power supply voltage terminals Vcc and GND, and their drain electrodes coupled in common to a current mirror node 84, which is coupled over a mirrored current feedback path 85 to the second input 52 of the amplifier 50. The mirrored current feedback path 85 from node 84 supplies a feedback current Ifb as a very small fraction k of the output current Iout provided at node 83 and thereby at output node 62 in accordance with the ratios of the geometries of the output to current mirror MOSFETs. As a non-limiting example, a MOSFET geometry ratio of 100:1 would result in a value of k on the order of 0.01. Except for the value of the bias voltage Vmid at amplifier input 51, the gain and output impedance relationships are those set forth above for FIG. 4.

As referenced above, FIG. 5 shows a single ended implementation of a first embodiment of the sensed output current-based synthesized impedance line driver of the invention. To compensate for distortion that may result from non-linearities in the ratios of the geometries of the current mirror and output MOSFETs a pair of the drivers of FIG. 5 may be coupled in a bridge configuration.

The fact that output MOSFETs 82, 92 and current mirror MOSFETs 81, 91 of FIG. 5 do not see the same drain-source voltage can be a significant source of distortion, preventing the mirror current MOSFETs 81 and 91 from tracking output MOSFETs 82 and 92, respectively. This problem is remedied by the embodiment of FIG. 6, in which the input resistor 54 of FIG. 5 is removed, and the input Vin is applied to the non-inverting (+) input 51 of operational amplifier 50. Due to the high gain of the amplifier 50, both of its inputs 51 and 52 are maintained at substantially the same voltage.

In the no-load case, the voltage $V_{84}$ at current mirror node 84 and the voltage $V_{83}$ at the output node 83 are the same. However, as the load increases, these voltages diverge, causing an increase in distortion in the ratio k of mirror current Ifb to output current Iout. Yet, this distortion is less than the distortion would be in the embodiment of FIG. 5, since the magnitude of the voltage difference $|V_{84}-V_{83}|$ is smaller.

Figure 7:
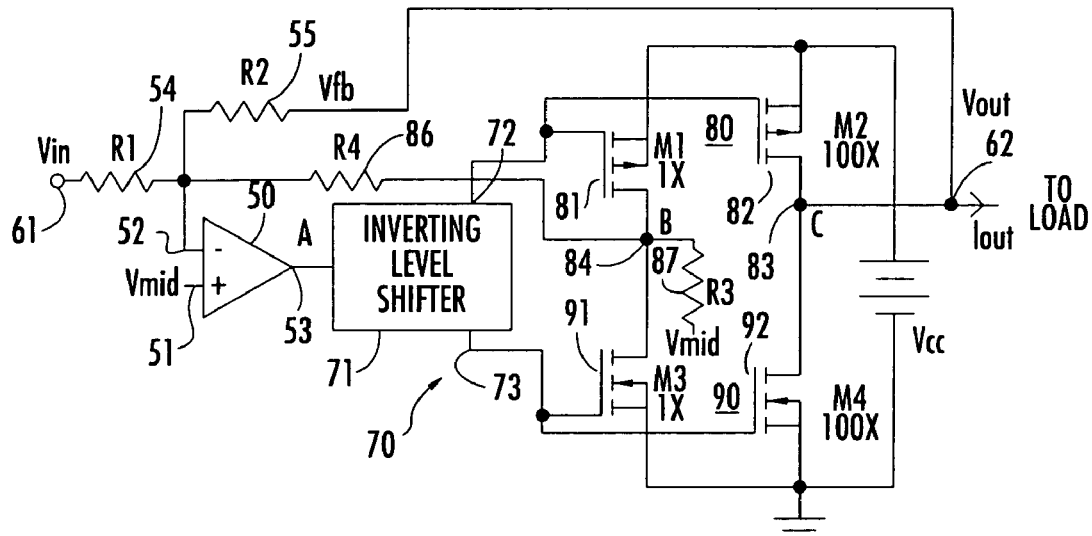
FIG. 7 diagrammatically illustrates a third embodiment of the sensed output current-based synthesized impedance line driver architecture of the invention.

As shown in the third embodiment of FIG. 7, this effect can be compensated for a given load impedance by inserting a first auxiliary resistor 86 (having a value R4) in the mirrored current feedback path 85, and coupling the current mirror node 84 through a second auxiliary resistor 87 (having a value R3) to the reference voltage (Vmid) applied to the non-inverting input 51 of amplifier 50. Defining the mirrored current ratio Ifb/Iout as k, the output impedance Zout of the embodiment of FIG. 7 becomes $$Zout=\{(k*R2*R3)/(R3+R4)\}*\{1+(k*R3)/(R3+R4)\}.$$

If $V_{84}$ is constrained to equal $V_{83}$ for a given value of load resistance RL, then (k*R3*R4)/(R3+R4)=RL∥R2.

By choosing k and Vout as independent variables, the values of R2, R3 and R4 are to be determined. It may be noted that R1 is only a portion of the open circuit voltage expression: Vout/Vin={−R2/R1}*{1/(1+(k*R3)/(R3+R4)}. As a result, there are the impedance constraining equation (Zout=RL), the voltage matching equation, and three unknowns. Although R3 and R4 are not limited to any particular values, making R3=R4 simplifies both equations and also realization of an integrated circuit chip.

Plugging these choices into the above expressions results in the following values for R2, R3 and R4:

1) R2=Zout*(1+2/k);
2) R3=R2/(1+k); and
3) R4=R3.

In those cases where k is small, as it should be for good efficiency, it is simpler, and still reasonably accurate, to make each of R2, R3 and R4 equal to 2*Zout/k.

Figure 8:
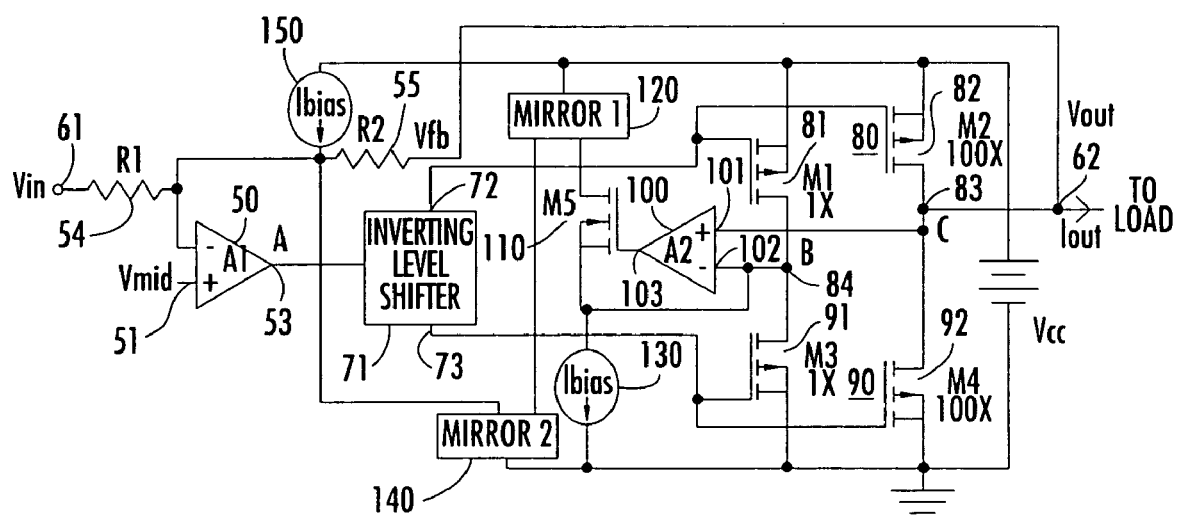
FIG. 8 diagrammatically illustrates a fourth embodiment of the sensed output current-based synthesized impedance line driver architecture of the invention.

FIG. 8 shows a fourth embodiment of the invention, which is configured to ensure that the voltage at the current mirror node 84 always tracks the output voltage at the output current node 83, and thereby removes current mirror distortion for all values of load resistance. For this purpose, a second, 'feedback' operational amplifier 100 has a first, non-inverting (+) input 101 coupled to node 83 and a second inverting (1) input 102 coupled to the current mirror node 84. The output 103 of the feedback operational amplifier 100 is coupled as the gate drive for a MOSFET 110, which has its source-drain path coupled to voltage rails Vcc and GND through a first auxiliary current mirror circuit 120 and a first auxiliary bias current (Ibias) source 130, referenced to GND, respectively. The first auxiliary bias current (Ibias) source 130 serves to maintain MOSFET 110 conducting for both polarities of output current (and also current through MOSFETs 81, 91).

A second auxiliary current mirror circuit 140 is coupled to the current mirror circuit 120 and to the input node 52 of amplifier 50, to which a second auxiliary bias (Ibias) current source 150, referenced to Vcc, is coupled. Coupling the second auxiliary bias current source to the inverting (−) input 52 of operational amplifier 50 effectively removes the Ibias current from the overall transfer function. The drain current of MOSFET 110 is mirrored by the auxiliary current mirror circuits 120 and 140 to the inverting input 52 of operational amplifier 50. The drain current of MOSFET 110 is the same current of MOSFETS 81 and 91, plus the bias current Ibias.

As will be appreciated from the foregoing description, the synthetic impedance driver circuit of the present invention is especially suited for high data rate (e.g., DSX-1) applications, as it provides substantially improved power utilization efficiency without having any power-dissipating (resistor) elements in series with the line driver's output. Instead, the output impedance Zout of the driver circuit is effectively synthesized by feeding back a mirrored fraction of the output current to an input node of the driver amplifier; this enables the output impedance Zout of the driver to be defined in terms of the mirror current ratio k and the value of the driver's feedback resistor.

While I have shown and described several embodiments in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. An amplifier driver for driving a load, comprising:
   a first operational amplifier having first and second differential polarity inputs and an output;
   an inverting level shifter connected to said output of said first operational amplifier and producing first and second level-shifted outputs;
   complementary first and second output transistor circuits and first and second current mirror circuits operatively connected to respective first and second level-shifted outputs and operative with each other, wherein said first and second current mirror circuits form a current mirror node and said first and second output transistor circuits form an output node, wherein at a no-load condition, the voltage at the current mirror node and voltage at the output node are substantially the same;
   a current feedback circuit extending from the current mirror node to an input of the first operational amplifier, and including a feedback operational amplifier positioned within the current feedback circuit and having an output, and a first input operatively connected to said output node and a second input operatively connected to said current mirror node, and first and second auxiliary bias current source circuits and first and second current mirror circuits operatively connected to said output of said feedback operational amplifier such that the current mirror node substantially tracks the output voltage at the output current node and substantially removes current mirror distortion for different values of load resistance.

2. The amplifier driver according to claim 1, wherein said current feedback circuit is connected to an inverting input of the first operational amplifier.

3. The amplifier driver according to claim 1, and further comprising a resistor circuit within said current feedback circuit.

4. The amplifier driver according to claim 1, wherein said first input of said feedback operational amplifier comprises a non-inverting input and said current feedback circuit is connected thereto.

5. The amplifier driver according to claim 1, and further comprising a feedback transistor operatively connected to said output of said feedback operational amplifier.

6. The amplifier driver according to claim 5, wherein said feedback transistor comprises a MOSFET, and said feedback operational amplifier is operative as a gate driver for said MOSFET.

7. The amplifier driver according to claim 6, wherein said MOSFET has a source-drain path coupled to voltage rails through the first auxiliary bias current source circuit.

8. An amplifier driver for driving a load, comprising:
   a first operational amplifier having first and second differential polarity inputs and an output;
   an inverting level shifter connected to said operational output of said first amplifier and producing first and second level-shifted outputs;
   complementary first and second output transistor circuits and first and second current mirror circuits operatively connected to respective first and second level-shifted outputs and operative with each other, wherein said first and second current mirror circuits form a current mirror node and said first and second output transistor circuits form an output node, wherein at a no-load condition, the voltage at the current mirror node and voltage at the output node are substantially the same;
   a current feedback circuit extending from the current mirror node to an input of the first operational amplifier, and including a feedback operational amplifier positioned within the current feedback circuit and having an output and a first input operatively connected to said output node and a second input operatively connected to said current mirror node, and first and second auxiliary bias current source circuits and first and second current mirror circuits operatively connected to said output of said feedback operational amplifier such that the current mirror node substantially tracks the output voltage at the output current node and substantially removes current mirror distortion for different values of load resistance, wherein said second current mirror circuit and second auxiliary bias current source are operatively connected to an input of said operational amplifier.

9. The amplifier driver according to claim 8, wherein said second auxiliary bias current source is operatively connected to an inverting input of the first operational amplifier.

10. The amplifier driver according to claim 9, wherein said auxiliary bias current source circuit is referenced to ground.

11. The amplifier driver according to claim 8, wherein said current feedback circuit is connected to an inverting input of the first operational amplifier.

12. The amplifier driver according to claim 8, and further comprising a resistor circuit within said current feedback circuit.

13. The amplifier driver according to claim 8, wherein said first input of said feedback operational amplifier comprises a non-inverting input and said current feedback circuit is connected thereto.

14. The amplifier driver according to claim 8, and further comprising a feedback transistor operatively connected to said output of said feedback operational amplifier.

15. The amplifier driver according to claim 14, wherein said feedback transistor comprises a MOSFET, and said feedback operational amplifier is operative as a gate driver for said MOSFET.

16. The amplifier driver according to claim 15, wherein said MOSFET has a source-drain path coupled to voltage rails through the first auxiliary bias current source circuit.

* * * * *